United States Patent [19]
Hackler

[11] 3,868,383
[45] Feb. 25, 1975

[54] PROCESS FOR PREPARING 5-(α-CYANOBENZYLIDENE) OXAZOLIDINE-2, 4-DIONES

[75] Inventor: Ronald E. Hackler, Indianapolis, Ind.

[73] Assignee: Eli Lilly and Company, Indianapolis, Ind.

[22] Filed: Apr. 23, 1973

[21] Appl. No.: 353,928

[52] U.S. Cl............ 260/307 B, 260/465 D, 424/272
[51] Int. Cl............................................. C07d 85/34
[58] Field of Search ................................ 260/307 B

[56] References Cited
UNITED STATES PATENTS
3,197,503   7/1965   Smith et al........................... 260/544

Primary Examiner—Raymond V. Rush
Attorney, Agent, or Firm—William E. Maycock; Everet F. Smith

[57] ABSTRACT 5-(αCyanobenzylidene)oxazolidine-2,4-diones, useful as antiviral agents, in mice are prepared by condensing a substituted cyanopyruvic acid ester with an isocyanate.

8 Claims, No Drawings

PROCESS FOR PREPARING 5-(α-CYANOBENZYLIDENE) OXAZOLIDINE-2,4-DIONES

BACKGROUND OF THE INVENTION

This invention relates to oxazolidine-2,4-diones. More particularly, this invention relates to the preparation of 5-(α-cyanobenzylidene)oxazolidine-2,4-diones useful as antiviral agents in mice.

It recently has been discovered that 5-(α-cyanobenzylidene)oxazolidine-2,4-diones are useful as antiviral agents. However, such compounds cannot be obtained by any of the known methods for preparing oxazolidine-2,4-diones.

Of course, oxazolidine-2,4-diones having exo double bonds are known. For example, treating the phenylurethane of chloral cyanohydrin with boiling aqueous sodium carbonate gives 3-phenyl-5-dichloromethyleneoxazolidine-2,4-dione (H. Irving and H. Marston, J. Chem. Soc., 1940, 1512). This compound also can be prepared by the reaction of ethyl trichlorolactate with phenyl isocyanate (Belgian Patent 766,881). 3-Substituted-5-methyleneoxazolidine-2,4-diones are obtained by thermally cyclizing compounds having the following general formula:

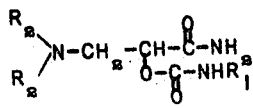

wherein $R_1$ is a monovalent aliphatic, cycloaliphatic, araliphatic, or aromatic group, and $R_2$ is a monovalent aliphatic or cycloaliphatic group (German Patent No. 1,947,193).

All of the foregoing procedures involve cyclization reactions which lead directly to oxazolidine-2,4-diones having exo double bonds. More indirect procedures, however, also are known. For example, 5-benzylidene-1,3-dioxolane-2,4-dione is obtained by reacting phenylpyruvic acid with phosgene in the presence of triethylamine. Treating the dioxolane with triethylamine and phenyl isocyanate in benzene results in the formation of 3-phenyl-5-benzylideneoxazolidine-2,4-dione (B. W. Dominy and R. G. Lawton, Chemical Communications, 1968, 1448). Benzylideneoxazolidine-2,4-dione reportedly is obtained by condensing benzaldehyde with oxazolidine-2,4-dione [S. N. Baranov and I. D. Komaritsa, Khim. Geterotsikl. Soedin., Akad. Nauk Latv. SSR, 1965, 69 [C.A., 63, 4116f (1965)]]. The same compound also has been prepared by the peroxide oxidation of 5-benzylidene-2-thiono-4-oxazolidone [S. N. Baranov, Zh. Obshch. Khim., 32, 1230 (1962) [C. A., 58, 5655d (1962)]].

SUMMARY OF THE INVENTION

It therefore is an object of the present invention to provide a process for the preparation of 5-(α-cyanobenzylidene)oxazolidine-2,4-diones which are useful as anti-viral agents in mice.

In accordance with the present invention, 5-(α-cyanobenzylidene)oxazolidine-2,4-diones are prepared by the process which comprises reacting a substituted cyanopyruvic acid ester with an isocyanate, in a solvent and, preferably, in the presence of a urethane catalyst.

DETAILED DESCRIPTION OF THE INVENTION

The compounds prepared by the process of the present invention are represented by the following general formula:

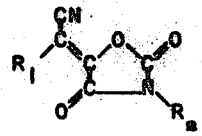

wherein $R_1$ is a monovalent organic group selected from the group consisting of phenyl, p-chlorophenyl, and p-fluorophenyl, and $R_2$ is a monovalent organic group selected from the group consisting of phenyl, p-chlorophenyl, 1-naphthyl, and $C_1$–$C_{18}$ alkyl; with the limitations that when $R_2$ is naphthyl, $R_1$ is phenyl, and when $R_1$ is p-fluorophenyl, $R_2$ is $C_1$–$C_{18}$ alkyl. Thus, when $R_2$ is naphthyl, $R_1$ can only be phenyl for antiviral activity to be present; similarly, when $R_1$ is p-fluorophenyl, $R_2$ must be $C_1$–$C_{18}$ alkyl.

As stated hereinabove, the process of the present invention comprises reacting a substituted cyanopyruvic acid ester with an isocyanate and in the presence of a solvent and, preferably, a urethane catalyst.

The useful substituted cyanopyruvic acid esters which are employed in said process have the following general formula:

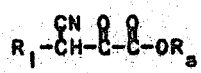

wherein $R_1$ is as defined above and $R_3$ is a monovalent $C_1$–$C_6$ alkyl group. As used herein, the term "$C_1$–$C_6$ alkyl group" is meant to include alkyl groups having from one to about 6 carbon atoms, examples of which include methyl, ethyl, n-propyl, isopropyl, n-butyl, sec-butyl, isobutyl, t-butyl, n-pentyl, isopentyl, 2-methylbutyl, 2-methyl-2-butyl, n-hexyl, 2,3-dimethylbutyl, and the like. The preferred $C_1$–$C_6$ alkyl groups are the straight-chain alkyl groups, with methyl and ethyl being most preferred.

Suitable cyanopyruvic acids, the esters of which as described hereinabove can be employed in the process of the present invention, include phenylcyanopyruvic acid, p-chlorophenylcyanopyruvic acid, and p-fluorophenylcyanopyruvic acid. Esters of such acids are readily prepared by any of the various means known to those skilled in the art. A particularly useful procedure is found in A. H. Blatt, Editor, "Organic Syntheses," Collective Volume II, John Wiley and Sons, Inc., New York, 1943, p. 287, wherein ethyl oxalate and benzyl cyanide are condensed in the presence of sodium ethoxide in ethanol to give ethyl phenylcyanopyruvate.

Examples of isocyanates useful in the process of the present invention include, among others, phenyl isocyanate, p-chlorophenyl isocyanate, 1-naphthyl isocyanate, methyl isocyanate, ethyl isocyanate, n-propyl isocyanate, isopropyl isocyanate, n-butyl isocyanate, sec-butyl isocyanate, isobutyl isocyanate, t-butyl isocyanate, n-pentyl isocyanate, isopentyl isocyanate, n-hexyl isocyanate, 2-ethylbutyl isocyanate, 2,2-dimethylbutyl isocyanate, 2,3-dimethyl-2-butyl isocyanate, n-heptyl isocyanate, 2,3,3-trimethylbutyl isocyanate, n-octyl isocyanate, 2,4,4-trimethylpentyl isocyanate, 2,4- dimethylhexyl isocyanate, 2-ethylhexyl isocyanate, 4-ethyl-3-hexyl isocyanate, n-nonyl isocyanate, 2,6-dimethylheptyl isocyanate, n-decyl isocyanate, n-undecyl isocyanate, n-dodecyl isocyanate, isotetradecyl isocyanate, n-hexadecyl isocyanate, and n-octadecyl isocyanate.

In general, the reaction or process of the present invention is carried out in a solvent or solvent mixture having no active hydrogen atoms. Examples of suitable solvents include, among others, aromatic hydrocarbons, such as benzene, toluene, the xylenes, and the like; halogenated hydrocarbons, such as chloroform, ethylene dichloride, perchloroethylene, chlorobenzene, and the like; ketones, such as acetone, methyl ethyl ketone, methyl isobutyl ketone, and the like; ethers, such as ethyl ether, methyl isopropyl ether, n-butyl ether, α-methoxytoluene, 2-methoxytoluene, 3-methoxytoluene, 4-methoxytoluene, ethoxybenzene, 1,3-dioxane, 1,4-dioxane, tetrahydrofuran, and the like; and miscellaneous solvents, such as N,N-dimethylformamide, N,N-dimethylacetamide, dimethyl sulfoxide, N-methyl-2-pyrrolidone, and the like. The preferred solvents are ethers, with ethyl ether and tetrahydrofuran being most preferred.

The amount of solvent employed is not critical, but generally is dependent upon the solubility characteristics of the reactants. Usually the reactants will constitute less than about 50 percent by weight of the reaction mixture; preferably, the reactants will constitute less than about 20 percent by weight of the reaction mixture.

As indicated hereinbefore, the use of a catalyst is optional. Expectedly, when a catalyst is not employed, the reaction between a substituted cyanopyruvic acid ester and an isocyanate requires a longer reaction time and-/or a higher reaction temperature. Consequently, the use of a catalyst is preferred.

Catalysts suitable for use in the process of the present invention in general are those which catalyze the reactions of isocyanates with compounds having an active hydrogen atom, e.g., alcohols, hydrazines, and amines, among others. Because the products of such reactions frequently are urethanes, said catalysts are referred to herein as urethane catalysts. For a review of urethane formation from isocyanates which includes a discussion of suitable catalysts, see S. R. sandler and W. Karo, "Organic Functional Group Preparations," Vol. 2, Academic Press Inc., New York, 1971, pp. 223-234.

In general, the catalysts suitable for use in the process of the present invention include tertiary amines, tin salts, and organotin and related compounds. Examples of suitable catalysts include, among others, N-methylmorpholine, N-ethylmorpholine, ethyl morpholinoacetate, dimorpholinomethane, N-(3-dimethylaminopropyl)morpholine, trimethylamine, triethylamine, tripropylamine, triisopropylamine, tributylamine, triethylenediamine, N-methylpiperidine, N,N,N',N'-tetramethyl-1,3-propanediamine, N,N,N',N'-tetramethyl 1,3butanediamine, N,N-dimethyl-N',N'-diethyl-1,3-propanediamine, N,N,N',N',N''-pentamethyldiethylenediamine, N,N,N',N'-tetraethylmethanediamine, bis(2-diethylaminoethyl)adipate, bis(2-dimethylaminoethyl)adipate, N,N-dimethylcyclohexylamine, N,N-diethylcyclohexylamine, N-methyl-N-octylcyclohexylamine, N-methyl-N-dodecylcyclohexylamine, N-methyl-N-(2-ethylhexyl)-cyclohexylamine, N-methyldicyclohexylamine, 1,4-diazabicyclo-[2.2.2]octane, 1,2-dimethylamidazole, quinine, pyridine, 2-methylpyridine, stannous chloride, stannic chloride, tetra-n-butyltin, tetraphenyltin, tri-n-butyltin acetate, dimethyltin dichloride di-n-butyltin diacetate, di-n-butylin dichloride, di-n-butylin dilaurate di-n-butyltin dilauryl-mercaptide, bis(2-ethylhexyl)tinoxide, di-n-butyltin sulfide, 2-ethylhexylstannoic acid, ferric acetylacetonate, and the like. The tertiary amines are preferred and triethylenediamene is most preferred.

The amount of catalyst employed can vary from about 0.001 mole about 0.01 mole per mole of substituted cyanopyruvic acid ester; preferably, the amount of catalyst employed will be about 0.005 mole per mole of substituted cyanopyruvic acid ester.

In general, the process in the present invention can be carried out at temperatures in the range from about 20°C. to the reflux temperature of the solvent or solvents employed. Obviously, the upper temperture limit must be below the decomposition temperature of the least-stable reactant. Preferably, the reaction temperature will be below about 100°C.

The molar ratio of substituted cyanopyruvic acid ester to isocyanate normally will be 1:1, which ratio is preferred. However, this ratio can vary from about 2:1 or higher to about 1:2 or lower.

While the reaction normally will be carried out at atmospheric pressure, sub- or superatmospheric pressures can be employed if desired or necessary, e.g., to lower or raise the boiling point of the solvent employed or to shift the reaction equilibrium.

Reaction times generally are dependent upon the reaction conditions employed, the most important factors being reaction temperature and catalyst. Usually, reaction times will vary from about 1 hour to about 6 weeks or longer. Understandably, reaction times at ambient temperature usually are substantially longer than reaction times at elevated temperatures, such as the reflux temperature of the solvent.

The products of the reaction in general are isolated by known methods. For example, when the product crystallizes from the reaction medium, isolation is accomplished by filtration. In most cases, purification can be accomplished by recrystallization from suitable solvents, although other procedures, such as chromatography, can be employed. Yields generally are high, with most losses occurring from purification procedures.

The compounds of the present invention are useful an antiviral agents, in mice e.g., against PR8, group A2, influenza virus and MHV3 strain of mouse hepatitis virus. The compounds may be administered by any convenient parenteral route, i.e., subcutaneously, intravenously, intramuscularly, or intraperitoneally.

The dosage administered will be dependent upon the age, health, and weight of the recipient; kind of concurrent treatment, if any; frequency of treatment; and nature of the effect desired. Generally, a daily dosage of a compound of the present invention will be from about 50 to about 200 milligrams per kilogram of body weight, although lower or higher amounts can be used. Usually, from about 50 to about 150, preferably from about 50 to about 100, milligrams per kilogram per day in one or more applications per day is effective to obtain the desired result.

The present invention will be more fully described, without intending to limit it in any manner, by the following examples which illustrate certain preferred embodiments. Unless otherwise indicated, all percentages

EXAMPLE 1

A solution of 21.7 parts of ethyl phenylcyanopyruvate, 11.9 parts of phenyl isocyanate, and about 0.05 part of triethylenediamine in 430 parts of ether was allowed to stand at ambient temperature (about 23°) for 3 days. Most of the ether was evaporated under reduced pressure and petroleum ether, b.p. 60°–90°, was added to precipitate the reaction product. The precipitated crystals were collected by filtration and recrystallized, first from ethanol and then from methanol, to give 3-phenyl-5-($\alpha$-cyanobenzylidene)oxazolidine-2,4-dione, m.p. 216°. The infrared and nuclear magnetic resonance spectra of the product were consistent with the assigned structure. The following elemental analysis was obtained:

Calc. for $C_{17}H_{10}N_2O_3$: C, 70.34; H, 3.47; N, 9.65
Found: C, 70.45; H, 3.42; N, 9.36

EXAMPLE 2

The procedure of Example 1 was repeated, except that the phenyl isocyanate was replaced with 30.6 parts of 4-chlorophenyl isocyanate and the amount of ether was increased to 500 parts. Upon standing for 25 days, a solid precipitated which was isolated by filtration and washed with ether, giving 30 parts (90 percent yield) of 3-(4-chlorophenyl)-5-($\alpha$-cyanobenzylidene)oxazolidine-2,4-dione. A portion of the product was recrystallized twice from ethanol, giving an analytical sample, m.p. 228°. The following elemental analysis was obtained:

Calc. for $C_{17}H_{19}ClN_2O_3$: C, 62.87; H, 2.79; N, 8.62
Found: C, 62.59; H, 2.82; N, 8.89

3-(4-Chlorophenyl)-5-($\alpha$-cyanobenzylidene)oxazolidine-2,4-dione also was prepared by refluxing for 1 hour a solution of 57.4 parts of ethyl phenylcyanopyruvate and 47.6 parts of 4-chlorophenyl isocyanate in 580 parts of tetrahydrofuran. The reaction solution was cooled and product precipitated by adding hexane. The resulting solid was collected by filtration and washed with ether to give 56.3 parts (83 percent) of product, m.p. 201°–209°.

EXAMPLE 3

A solution of 16 parts of ethyl phenylcyanopyruvate, 25 parts of 1-naphthyl isocyanate, and about 0.05 part of triethylenediamine in 360 parts of ether was allowed to stand at ambient temperature for about 6 weeks. The solid which had precipitated was collected by filtration and washed with ether, giving 25 parts (80 percent yield) of 3-(1-naphthyl)-5-($\alpha$-cyanobenzylidene)oxazolidine-2,4-dione. A portion of the product was recrystallized twice from ethanol to give an analytical sample, m.p. 204°–205°. The following elemental analysis was obtained:

Calc. for $C_{21}H_{12}N_2O_3$: C, 74.11; H, 3.55; N, 8.23
Found: C, 74.26; H, 3.84; N, 8.28

EXAMPLE 4

The procedure of Example 3 was repeated, except that the ethyl phenylcyanopyruvate was replaced with 15.1 parts of ethyl 4-chlorophenylcyanopyruvate and the 1-naphthyl isocyanate was replaced with 14.3 parts of phenyl isocyanate. After seven days, the solid which had precipitated was collected by filtration and washed with ether, giving 10.5 parts (35 percent) of 3-phenyl-5-($\alpha$-cyano-p-chlorobenzylidene)oxazolidine-2,4-dione. A portion of the product was recrystallized twice from N,N-dimethylformamide-ethanol to provide an analytical sample, m.p. 236°–238°. The following elemental analysis was obtained:

Calc. for $C_{17}H_9ClN_2O_3$: C, 62.87; H, 2.79; N, 8.62
Found: C, 62.91; H, 2.91; N, 8.87

EXAMPLE 5

Ethyl 4-chlorophenylcyanopyruvate, 12.6 parts, was dissolved in 360 parts of ether, to which solution was added about 0.05 part of triethylenediamine dissolved in several parts of ether. To the resulting solution was added a solution of 15.4 parts of 4-chlorophenyl isocyanate dissolved in 90 parts of ether. The reaction solution was allowed to stand for 6 days at ambient temperature. The yellow solid which precipitated was isolated by filtration and washed twice with ether to give 10 parts (55 percent) of 3-(4-chlorophenyl)-5-($\alpha$-cyano-p-chlorobenzylidene)oxazolidine-2,4-dione. An attempt to recrystallize a portion of the product from ethanol resulted in decomposition, giving red crystals, m.p. 328°–330°. The following elemental analysis was obtained on the unrecrystallized product:

Calc. for $C_{17}H_8Cl_2N_2O_3$: C, 56.84; H, 2.24; N, 7.80
Found: C, 56.90; H, 2.51; N, 7.67

EXAMPLE 6

Ethyl phenylcyanopyruvate, 6.5 parts, was dissolved in 140 parts of ether, to which solution was added about 0.05 part of triethylenediamine dissolved in several parts of ether. To the resulting solution was added a solution of 4.3 parts of ethyl isocyanate in 70 parts of ether. The reaction solution was allowed to stand for 10 days at ambient temperature. The reaction solution was filtered and the filtrate concentrated to dryness to give 7.6 parts of yellow crystals. The solid was recrystallized three times from ethanol-water to give 3-ethyl-5-($\alpha$-cyanobenzylidene)oxazolidine-2,4-dione, m.p. 170°–172°. The following elemental analysis was obtained:

Calc. for $C_{13}H_{10}N_2O_3$: C, 64.46; H, 4.16; N, 11.56
Found: C, 64.40; H, 4.34; N, 11.54

EXAMPLE 7

A solution of 8.7 parts of ethyl phenylcyanopyruvate, 6.8 parts of n-propyl isocyanate, and about 0.05 part of triethylenediamine in 150 parts of ether was allowed to stand at ambient temperature for 10 days. The very dark reaction solution was filtered and the filtrate concentrated to an oil. The oil was triturated with ether and a large quantity of hexane. Filtration of the resulting mixture gave 9.8 parts of solid. A portion of the solid, 6.5 parts, was taken up in 80 parts of ethanol. To the resulting solution was added 5 parts of 2N aqueous sodium hydroxide. The solution then was heated gently for about 2 minutes and cooled. Water was added until crystallization began. Filtration of the crystallized material gave 1.5 parts of 3-n-propyl-5-($\alpha$-cyanobenzylidene)oxazolidine-2,4-dione, m.p. 137°–138°. The following elemental analysis was obtained:

Calc. for $C_{14}H_{12}N_2O_3$: C, 65.62; H, 4.72; N, 10.93
Found: C, 65.64; H, 4.91; H, 10.63

EXAMPLE 8

The procedure of Example 6 was repeated, except that the ethyl isocyanate was replaced with 5.9 parts of n-butyl isocyanate. After standing at ambient temperature for three weeks, the reaction solution was filtered and the filtrate concentrated to dryness. The residue was triturated with benzene-hexane. Filtration of the resulting mixture gave 1.9 parts of product, recrystallization of which from benzenehexane hexane gave 3-n-butyl-5-(α-cyanobenzylidene)oxazolidine-2,4-dione, m.p. 114°–116°. The following elemental analysis was obtained:

Calc. for $C_{15}H_{14}N_2O_3$: C, 66.66; h, 5.22; N, 10.36
Found: C, 66.71; H, 5.09; N, 10.31

EXAMPLE 9

The procedure of Example 7 was repeated, except that the amount of ethyl phenylcyanopyruvate was increased to 10.9 parts, the n-propyl isocyanate was replaced with 10.2 parts of n-hexyl isocyanate, the total amount of ether was increased to 290 parts, and the reaction time was decreased to 6 days. The reaction yielded 9.5 parts of crude product. A portion of the product was recrystallized first from ether-hexane, followed by a second recrystallization as described in Example 7, using 68 parts of ethanol. The yield of recrystallized 3-n-hexyl-5-(α-cyanobenzylidene)oxazolidine-2,4-dione was 1.6 parts, m.p. 72°–75°. The following elemental analysis was obtained:

Calc. for $C_{17}H_{18}N_2O_3$: C, 68.44; H, 6.08; N, 9.39
Found: C, 68.38; H, 6.17; N, 9.14

EXAMPLE 10

A mixture of 10.9 parts of ethyl phenylcyanopyruvate, 12.4 parts of n-octyl isocyanate, about 0.05 part of triethylenediamine, and 225 parts of tetrahydrofuran was refluxed for two hours. The reaction mixture was filtered and the filtrate concentrated to an oil. The oil was admixed with solid carbon dioxide. Ether and hexane then were added to the admixed oil and the resulting mixture was filtered to give 13.2 parts of product. The material was recrystallized as described in Example 7 to give 4.2 parts of 3-n-octyl-5-(α-cyanobenzylidene)oxazolidine-2,4-dione, m.p. 77°–81°. The following elemental analysis was obtained:

Calc for $C_{19}H_{22}N_2O_3$: C, 69.92; H, 6.79; N, 8.58
Found: C, 69.64; H, 7.03; N, 8.87

EXAMPLE 11

The procedure of Example 10 was repeated, except that the ethyl phenylcyanopyruvate was replaced with 12.6 parts of ethyl 4-chlorophenylcyanopyruvate and the amount of tetrahydrofuran was increased to 315 parts. The reaction mixture was filtered, concentrated, and triturated with etherhexane. Filtration of the resulting mixture gave 14.3 parts of product. The material was successively recrystallized from ether-hexane, ethanol and base as described in Example 7, and aqueous ethanol to give 3-n-octyl-5-(α-cyano-p-chlorobenzylidene)oxazolidine-2,4-dione, m.p. 85°–88°. The following elemental analysis was obtained:

Calculated for $C_{19}H_{21}ClN_2O_3$: C, 63.24; H, 5.87; N, 7.76
Found: C, 62.98; H, 6.14; N, 7.67

EXAMPLE 12

The procedure of Example 7 was repeated, except that the n-propyl isocyanate was replaced with 14.8 parts of n-dodecyl isocyanate and the amount of ether employed was increased 285 parts. The reaction mixture was filtered, giving 0.25 part of yellow crystals. The filtrate was evaporated to an oil which, upon refrigerating overnight, solidified. The solidified oil was dissolved in ether, concentrated, and hexane added; cooling resulted in crystallization. Filtration yielded 13.6 parts of 3-n-dodecyl-5-(α-cyanobenzylidene)oxazolidine-2,4-dione. The material was recrystallized from aqueous ethanol to give 5.0 parts of almost white crystals, m.p. 55°–58°, which gave the following elemental analysis:

Calc. for $C_{23}H_{30}N_2O_3$: C, 72.22; H, 7.91; N, 7.32
Found: C, 71.98; H, 7.98; N, 7.09

EXAMPLE 13

A solution of 2.4 parts of ethyl 4-fluorophenylcyanopyruvate, 4.2 parts of n-dodecyl isocyanate, and about 0.05 part of triethylenediamine in 150 parts of ether was allowed to stand at ambient temperature for 16 days. The reaction solution was filtered and the filtrate concentrated to give 3.1 parts of yellow crystals. The meaterial was recrystallized 3 times from aqueous ethanol to give 3-n-dodecyl-5-(α-cyano-p-fluorobenzylidene)oxazolidine-2,4-dione, m.p. 68°–70°. (Material solidified at about 70° and then remelted at 105°). The following elemental analysis was obtained:

Calc. for $C_{23}H_{29}FN_2O_3$: C, 68.96; H, 7.30; N, 6.99
Found: C, 69.25; H, 7.51; N, 7.01

EXAMPLE 14

The procedure of Example 13 was repeated, except that the ethyl 4-fluorophenylcyanopyruvate was replaced with 7.5 parts of ethyl 4-chlorophenylcyanopyruvate and the n-dodecyl isocyanate was replaced with 17.7 parts of n-octadecyl isocyanate. The solid which formed was isolated by filtration (the filtrate solidified), giving 14.3 parts of 3-n-octadecyl-5-(α-cyano-p-chlorobenzylidene)oxazolidine-2,4-dione. Recrystallization of the product from benzene-hexane gave three crops of crystals. The third crop was recrystallized from methanol to give an analytical sample, m.p. 85°–88°. The nuclear magnetic resonance spectrum of the product was consistent with the assigned structure.

What is claimed is:

1. A process for the preparation of 5-(α-cyanobenzylidene)oxazolidine-2,4-diones of the formula,

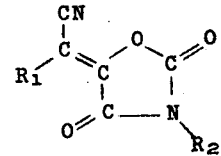

which process comprises the step of reacting a substituted cyanopyruvic acid ester of the formula, $$R_1-\underset{\underset{CN}{|}}{CH}-\underset{\underset{O}{\|}}{C}-\underset{\underset{O}{\|}}{C}-OR_3$$

with an isocyanate of the formula, $$R_2NCO$$

in a solvent or solvent mixture having no active hydrogen atoms; wherein $R_1$ is a monovalent organic group selected from the group consisting of phenyl, p-chlorophenyl, and p-fluorophenyl; $R_2$ is a monovalent organic group selected from the group consisting of phenyl, p-chlorophenyl, 1-naphthyl, and $C_1$–$C_{18}$ alkyl, with the limitations that when $R_2$ is naphthyl, $R_1$ is phenyl, and when $R_1$ is p-fluorophenyl, $R_2$ is $C_1$–$C_{18}$ alkyl; and $R_3$ is monovalent $C_1$–$C_6$ alkyl.

2. The process of claim 1, wherein said solvent is selected from the group consisting of ethers.

3. The process of claim 2, wherein said solvent is selected from the group consisting of ethyl ether and tetrahydrofuran.

4. The process of claim 1, wherein said process is carried out in the presence of a tertiary amine catalyst.

5. The process of claim 4, wherein said catalyst is triethylenediamine.

6. The process of claim 1, wherein $R_3$ is ethyl.

7. The process of claim 1, wherein $R_2$ is straightchain $C_1$–$C_{18}$ alkyl.

8. The process of claim 7, wherein $R_2$ is selected from the group consisting of n-butyl, n-hexyl, n-octyl, and n-dodecyl.

* * * * *